UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

MATERIAL FOR ROOFING, &c., AND METHOD OF PREPARING THE SAME.

1,077,113.  Specification of Letters Patent.  Patented Oct. 28, 1913.

No Drawing.  Application filed September 1, 1910. Serial No. 580,058.

*To all whom it may concern:*

Be it known that I, JONAS W. AYLSWORTH, a citizen of the United States, and a resident of East Orange, in the county of Essex and State of New Jersey, have invented a certain new and useful Material for Roofing, &c., and Method of Preparing the Same, of which the following is a description.

My invention relates to a new article of manufacture in the class of substances used for roofing and other building purposes, which substance or composition may likewise be used for the manufacture of furniture, window casings, sashes, and trimming for fire-proof buildings.

The object of my invention is the production of relatively light-weight sheets of a durable material, which is non-inflammable, water-proof, and infusible, and which will not soften or blister by the heat of the sun, or be destroyed by the action of light, heat and moisture, and which may readily be applied and supplied in a variety of permanent colors. The material in transparent or translucent form is likewise adapted for use in roofs of factories in which increased light is desired, it thus being possible to cause the whole roof to transmit light to the interior.

The invention comprises a building material in sheeted form of an infusible condensation product of a phenolic body with formaldehyde or other substance containing the methylene radical $CH_2$, intimately mixed or combined with a non-inflammable chlorinated organic radical, a mineral pigment or filler, and reinforced with a fibrous or filamentary substance which may be of organic or inorganic origin, such as hemp, cotton, flax, jute, hair, wood pulp, asbestos, or filamentary metal. By a condensation product of phenolic bodies I mean infusible, hard final condensation products, such as are described by me in my application Serial No. 496,060, Plastic composition and process of manufacturing the same, filed May 14, 1909, and Patent No. 1,020,593, granted March 19, 1912, Phenolic condensation product and method of preparing same, and the similar final condensation products described by Baekeland in his Patent No. 942,699, December 7, 1909, Method of making insoluble products of phenol and formaldehyde, and other patents of the same inventor and others. By non-inflammable organic radical I intend to include such bodies as solid or liquid substitution products of a halogen, preferably chlorin, which are stable and may successfully be incorporated with the mass at some stage of its formation previous to the infusible state. Such bodies as the chlor-naphthalenes, chloro-benzenes, chlor-toluenes, chloro-phenols, chloro-anthracenes, and per-chlor-ethanes may be used, but on account of cheapness and other advantages produced, I prefer to use a chloro-naphthalene, which may either be the liquid mono or di-chloro-naphthalene or any of the higher chloro-naphthalenes which have sufficiently low melting points to readily be incorporated with the phenolic condensation body previous to rendering the same infusible by the application of heat. The higher chlorinated naphthalenes are, however, more efficient in rendering the product non-inflammable. I have found that these bodies may be dissolved in an initial or incompletely condensed condensation product previous to hardening by the completed reaction or in the ingredients which react upon sufficient application of heat to yield the final condensation product, and are retained therewith in solid solution or solid emulsion after the product has become hardened and infusible and cannot readily be separated from the condensation product. The mass may be colored by suitable mineral pigments, and may be incorporated with cheap filling bodies such as plaster of Paris, barium sulfate, sand, clay, infusorial earth, etc. For reinforcing the product, I prefer to use asbestos fiber and a coarse meshed gauze of fine wire, as this product is the most fire-resisting. I may, however, use other fibrous substances or woven fabrics and still maintain a sufficient degree of non-inflammability to render the product useful for the purpose.

As I have indicated, the condensation product may be formed either by heating a sufficient amount of phenol and formaldehyde or their equivalents to form a final infusible product and carrying out the process in two or three stages, as indicated by Baekeland, or I can first form a fusible soluble phenolic condensation product or phenol resin, as described in my applications referred to, and cause a further reaction to take place between the same and a sufficient amount of hexa-methylene-tetramin, tri-oxy-methylene, or other substance containing the methylene radical $CH_2$ which will react with phenol resin on application of sufficient heat to form the final hard infusible product. I consider the latter method preferable.

The product contemplated by my present invention may be formed by incorporating chloro-naphthalene or equivalent substance as described to the extent of 10 to 60 per cent. of the weight of the phenolic body, with the phenolic body before the reaction has taken place, or at some stage in the reaction previous to the formation of the final or infusible product. The product thus formed is incorporated with as much asbestos as it will take without becoming too unplastic to be readily formed in sheets by calender rolls or pressing between plates. 1 to 2 parts of asbestos and 2 parts of the condensation product containing the chloro-naphthalene are suitable proportions for sheeting on the calender rolls. When the product is made in sheets by hydraulic pressure, a much larger amount of fibrous filler and mineral matter may be used. In this case the initial or partly condensed phenolic condensation product, or phenol resin mixed with the chloro-naphthalene or equivalent substance and a sufficient quantity of a formaldehyde or methylene-containing substance is dissolved in a suitable solvent and thoroughly mixed with the fibrous material until every particle becomes coated, and is then rapidly dried, preferably in a vacuum drying chamber, whereby the solvent may be recovered. The dried mass is then comminuted and pressed in sheets between plates in imitation of slate or shingles, or it may be pressed in dies in imitation of tiling.

When the material is desired in flexible sheets which may be supplied in rolls, a tightly woven fabric such as canvas is impregnated with a solution of the product in its incomplete state of reaction in a process such as described by Baekeland, or with a solution of phenol resin and a hardening methylene-containing agent in a process such as described in my previous applications referred to, and the solvent evaporated. The fabric is then subjected to heat and pressure for the purpose of hardening and consolidating the same into an impervious flexible difficultly inflammable sheet. These sheets may be nailed or screwed to timbers of the roof of a structure in the same manner as roofing paper.

An example of a composition which may be formed in sheets by calendering is the following:—100 parts by weight phenol resin (such as described in my previous applications referred to), 10 to 60 parts tetra-chloro-naphthalene, 7 to 12 parts hexa-methylene-tetramin or equivalent hardening agent, 50 to 200 parts comminuted asbestos fiber or mineral filler, 10 to 50 parts cow hair, 2 to 10 parts pigment. The proportion of fibrous and mineral constituents and pigment may be varied up to the limit at which the mass may be calendered.

In preparing this composition, the phenol resin and the chloro-naphthalene are first melted together in a suitable mixing vessel and kept at 200 to 230 degrees F. of heat, while the hexa-methylene-tetramin or equivalent methylene-containing agent is mixed therewith together with the pigment. The mass is quickly cooled before reaction can take place and powdered, and the powdered substance then mixed with the fibrous and powdered filling bodies. It is then mixed in suitable kneading machines or ore mixing rolls, heated with steam or hot water, and the plastic mass calendered in sheets of the required size and thickness. The sheets thus formed are heated to complete the condensation reaction to a temperature of from 260 to 300 degrees F. This may be done between sheets of polished metal in ovens or between steam heated platens, with or without hydraulic pressure. The sheets may be reinforced by calendering the same onto a coarse woven fabric of metal wire or other coarse woven fabric. An example of a composition designed to be pressed as a dry comminuted powder in heated molds in sheet or special forms is the following:—100 parts by weight phenol resin, 10 to 60 parts by weight halogenized naphthalene or equivalent halogenized organic radical, 7 to 12 parts hexa-methylene-tetramin or equivalent methyleneating agent, such as para-formaldehyde or thio-formic aldehyde, 100 to 300 parts neutral solvent, such as acetone, alcohol, methyl-alcohol, amyl-alcohol, amyl-acetate, or combination of the same which will act as a neutral solvent, 100 to 400 parts fibrous and powdered filler, such as asbestos fiber and powder, cow hair, wood pulp, cotton lint, plaster of Paris, barium sulfate, clay, infusorial earth, silica, slag, wool, powdered mica, etc., or mixtures of the same, 2 to 10 parts pigment. The phenol resin may be melted and mixed with the halogenized organic radical and the methyleneating agent at a low heat, cooled, powdered, and dissolved in the solvent and incorporated with the pigment. The solution is then thoroughly mixed with the filling ingredients and dried, preferably in a vacuum at a low heat, whereby the solvent may be recovered, and when dry, the mass, if lumpy, is comminuted and loaded onto the press plates or into suitable dies, and pressed hot until it has become consolidated. It is subsequently hardened without pressure, or the hardening reaction may be completed in the press, if desired. These sheets may also be reinforced with a coarse wire or other fabric by inserting the same in the powder before pressing.

Having now described my invention, what I claim and desire to secure by Letters Patent is as follows:—

1. As a new article of manufacture, sheets adapted for roofing or building purposes of an infusible phenolic condensation product having a stable halogen substitution product of an organic radical incorporated therewith, substantially as described.

2. As a new article of manufacture, a non-inflammable sheet composed of a phenolic condensation product having a halogenized naphthalene incorporated therewith, substantially as described.

3. As a new article of manufacture, a non-inflammable sheet formed of an insoluble infusible phenolic condensation product, a halogen substitution product of an organic radical, and a fibrous filling agent, substantially as described.

4. As a new article of manufacture, a non-inflammable sheet formed of an insoluble infusible phenolic condensation product, a halogen substitution product of an organic radical, and a fibrous filling agent with a reinforcing net or fabric, substantially as described.

This specification signed and witnessed this 19th day of August 1910.

JONAS W. AYLSWORTH.

Witnesses:
 DYER SMITH,
 H. H. DYKE.